United States Patent
Schidan et al.

(10) Patent No.: US 8,944,488 B2
(45) Date of Patent: Feb. 3, 2015

(54) VEHICLE DOOR ARRANGEMENT AND METHOD FOR THE ASSEMBLY THEREOF

(75) Inventors: Alexander Schidan, Solingen (DE); Hans-Helmut Mieglitz, Monheim (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/394,120

(22) PCT Filed: Sep. 6, 2010

(86) PCT No.: PCT/EP2010/005451
§ 371 (c)(1),
(2), (4) Date: May 21, 2012

(87) PCT Pub. No.: WO2011/029563
PCT Pub. Date: Mar. 17, 2011

(65) Prior Publication Data
US 2012/0299329 A1    Nov. 29, 2012

(30) Foreign Application Priority Data
Sep. 9, 2009    (DE) .......................... 10 2009 040 636

(51) Int. Cl.
*B60R 13/00* (2006.01)
*B60J 5/04* (2006.01)
*B60J 5/00* (2006.01)

(52) U.S. Cl.
CPC .............. *B60J 5/0469* (2013.01); *B60J 5/0408* (2013.01)
USPC ..................................................... 296/146.7

(58) Field of Classification Search
USPC ..................................................... 296/146.7
See application file for complete search history.

(56) References Cited

U.S. PATENT DOCUMENTS

| | | | |
|---|---|---|---|
| 3,791,693 A * | 2/1974 | Hellriegel et al. | 296/146.7 |
| 3,878,660 A | 4/1975 | Jacob | |
| 4,513,044 A * | 4/1985 | Shigeki et al. | 428/122 |
| 4,662,115 A * | 5/1987 | Ohya et al. | 49/502 |
| 5,050,351 A * | 9/1991 | Goldbach et al. | 49/502 |
| 5,085,006 A * | 2/1992 | Hayashi et al. | 49/482.1 |
| 5,374,386 A * | 12/1994 | Nagata | 264/145 |
| 5,447,326 A * | 9/1995 | Laske et al. | 280/728.3 |
| 6,186,579 B1 * | 2/2001 | Fussnegger et al. | 296/146.1 |
| 6,318,783 B1 * | 11/2001 | Knox | 296/39.1 |
| 6,422,640 B2 * | 7/2002 | Whitehead et al. | 296/146.7 |
| 6,481,775 B2 * | 11/2002 | Brocklehurst | 296/39.1 |

(Continued)

FOREIGN PATENT DOCUMENTS

| DE | 19639280 | 3/1998 |
|---|---|---|
| DE | 19959992 A1 | 6/2000 |

(Continued)

OTHER PUBLICATIONS

International Search Report for application No. PCT/EP2010/005451 mailed Dec. 3, 2010.

(Continued)

*Primary Examiner* — Dennis H Pedder
(74) *Attorney, Agent, or Firm* — Fletcher Yoder, P.C.

(57) ABSTRACT

A vehicle door arrangement includes a trim panel, a structural element and a second trim panel. A connection between the first trim panel and the second trim panel comprises a sealing element. The first trim panel comprises an attachment element which extends along the sealing element and interacts with the sealing element.

3 Claims, 7 Drawing Sheets

(56) References Cited

U.S. PATENT DOCUMENTS

| | | | |
|---|---|---|---|
| 6,619,724 B2 * | 9/2003 | Blomeling et al. | 296/146.5 |
| 6,708,462 B2 * | 3/2004 | Pokorzynski et al. | 52/716.5 |
| 6,767,049 B1 * | 7/2004 | Morrison et al. | 296/146.7 |
| 6,979,048 B2 * | 12/2005 | Isobe et al. | 296/146.7 |
| 6,991,278 B2 * | 1/2006 | Hockenberry et al. | 296/146.7 |
| 7,044,533 B2 * | 5/2006 | Dry et al. | 296/146.5 |
| 7,059,659 B2 * | 6/2006 | Smith et al. | 296/146.7 |
| 7,198,319 B2 * | 4/2007 | Schroder et al. | 296/146.7 |
| 7,431,379 B2 * | 10/2008 | Cowelchuk et al. | 296/146.7 |
| 7,536,830 B2 * | 5/2009 | Clark et al. | 49/377 |
| 7,608,316 B2 * | 10/2009 | Okajima et al. | 428/122 |
| 8,656,646 B2 * | 2/2014 | Mieglitz et al. | 49/502 |
| 2001/0029702 A1 * | 10/2001 | Heuel | 49/502 |
| 2006/0012218 A1 * | 1/2006 | Hockenberry et al. | 296/146.7 |
| 2006/0220414 A1 * | 10/2006 | Boyer | 296/146.7 |
| 2006/0261633 A1 * | 11/2006 | Winborn | 296/146.7 |
| 2008/0116722 A1 * | 5/2008 | Garcia Martin et al. | 296/208 |
| 2009/0322118 A1 * | 12/2009 | Koa | 296/146.7 |
| 2010/0187855 A1 * | 7/2010 | Kitajima et al. | 296/146.7 |

FOREIGN PATENT DOCUMENTS

| | | |
|---|---|---|
| DE | 10018186 A1 | 10/2001 |
| DE | 69704581 T2 | 10/2001 |
| DE | 10063417 A1 | 7/2002 |
| DE | 102 15 904 A1 | 10/2003 |
| DE | 102 41 046 A1 | 3/2004 |
| DE | 69919975 T2 | 9/2005 |
| DE | 102005040061 A1 | 3/2006 |
| DE | 102004050074 | 4/2006 |
| DE | 102006016409 A1 | 10/2007 |
| DE | 10 2007 061 209 A1 | 7/2009 |
| DE | 2952174 A1 | 3/2012 |
| EP | 1702779 * | 9/2006 |
| JP | 11-321319 | 11/1999 |

OTHER PUBLICATIONS

German patent application No. 10 2009 040 636.0-24 Office Action dated Mar. 14, 2012.
Japanese Office Action dated Aug. 14, 2013.

* cited by examiner

VEHICLE DOOR ARRANGEMENT AND METHOD FOR THE ASSEMBLY THEREOF

CROSS REFERENCE TO RELATED APPLICATIONS

This application claims priority from and the benefit of PCT Application No. PCT/EP2010/005451, filed on Sept. 6, 2010 and German Patent DE 10 2009 040 636.0, filed on Sept. 9, 2009; both entitled "Vehicle Door Arrangement and Method for the Assembly Thereof", which are herein incorporated by reference.

BACKGROUND

The present invention relates to a vehicle door arrangement with a first trim panel, a structural element and a second trim panel.

Vehicle doors of this type are known in general. For example, German laid-open specification DE 10 2007 061 209 A1 discloses a side door for a motor vehicle with an outer paneling. An outer paneling of this type serves for the esthetically advantageous covering of such a side door of a vehicle. With such technology, it is possible to produce a particularly lightweight vehicle door arrangement only with a considerable outlay, if at all.

SUMMARY

It was therefore the object of the present invention to provide a vehicle door which does not have the disadvantages of the prior art, or has them only to a restricted extent.

The object is achieved by a vehicle door arrangement with a first trim panel, a structural element and a second trim panel, wherein a connection between the first trim panel and the second trim panel is provided by means of a sealing element, wherein the first trim panel has an attachment element which extends along the sealing element and interacts with the sealing element. It is thereby advantageously possible according to the invention for a considerably lower component weight of the vehicle door arrangement to be obtained, in particular by, for example, a frame profile, for example an aluminum frame profile, being able to be used as the structural element, for which diverse paneling materials for the esthetically advantageous realization of the skin of the vehicle or of the vehicle door arrangement are possible. Possible structural elements here include, in particular, extruded profiles as the support frame of the vehicle door arrangement. In this connection, in particular paneling materials in the form of plastics elements, aluminum elements, glass fiber elements and/or carbon fiber elements are suitable as the outer panel. This enables considerable weight reductions to be obtained in particular by there being the option of using entirely different shapings as conventional steel sheet doors formed, for example, in a die.

The vehicle door arrangement according to the invention has an integrated fastening between the first trim panel and the second trim panel, wherein an attachment element of the first trim panel, which attachment element interacts with the sealing element, at least partially takes over the connecting function together with the sealing element.

According to a particularly preferred embodiment of the present invention, the sealing element is provided in a substantially completely encircling manner. This is understood according to the invention as meaning that the sealing element is provided in an encircling manner in a substantial surface region of the vehicle door arrangement. It is particularly preferred for the sealing element to be designed so as to encircle in a closed manner, however, provision may also be made for, for example, two overlapping ends of the sealing element to be provided or else for the two ends not to be connected to each other and therefore for the encircling of the sealing element to be only partially realized. According to the invention, by means of the sealing element provided in a substantially completely encircling manner, it is particularly advantageously possible to realize a good connection between the first trim panel and the second trim panel and at the same time to obtain an excellent tolerance-compensating effect of the different components of the vehicle door arrangement.

According to the invention, it is furthermore particularly preferred that the sealing element has an insertion groove, wherein an attachment region of the attachment element is provided engaging in the insertion groove. For example, the attachment region is provided as a substantially flat region which has two mutually opposite surfaces which, in the assembly state, bear against the insertion groove of the sealing element. This makes it possible to realize a particularly good connection between the first trim panel and the second trim panel of the vehicle door arrangement according to the invention. In this embodiment, it is in particular advantageously possible for the number of further connecting means (for example clips or clipping means) between the first trim panel and the second trim panel to be able to be reduced or else to be able to be entirely omitted.

According to an alternative embodiment of the vehicle door arrangement, it is furthermore also preferably provided that the sealing element has a clamping element, wherein an attachment surface of the attachment element is provided bearing against the clamping element on one side. This makes it advantageously possible according to the invention for good tolerance compensation to be possible during the assembly of the first and second trim panels. Furthermore, the assembly of the first and second trim panels with each other is also simplified.

According to all of the embodiments of the present invention, provision may be made according to the invention for the sealing element to enclose a reinforcing element. According to the invention, the enclosing of the reinforcing element may be provided either along the entire length of the sealing element in such a manner that the sealing element completely encloses the reinforcing element in a cross section along the length of the sealing element. However, as an alternative thereto, provision may also be made according to the invention for the reinforcing element to be provided only in subregions along the length of the sealing element.

According to the invention, provision is furthermore also preferably made for the second trim panel to have a further attachment element which extends along the sealing element and interacts with the sealing element. This makes it possible to produce a very solid connection between the first and second trim panels of the vehicle door arrangement in a particularly simple manner. In said last-mentioned embodiment with a further attachment element, provision is furthermore preferably made for the further attachment element to have a further attachment region, wherein the further attachment region is connected on both sides of a further insertion groove of the sealing element to the sealing element. This advantageously makes it possible according to the invention for a particularly stable connection to be possible between the first trim panel and the second trim panel via the sealing element.

According to the invention, it is furthermore also preferred that along the sealing element the further attachment region of the further attachment element, on the one hand, and the attachment region or the attachment surface of the attachment element are provided running substantially parallel to each other corresponding to an assembly direction. This affords the possibility of a connection of the first and second trim panels, which connection is particularly simple and is nevertheless stable and is particularly advantageous in terms of lightweight construction.

The present invention furthermore relates to a method for the assembly of a vehicle door arrangement with a first trim panel, a structural element and a second trim panel, wherein a connection between the first trim panel and the second trim panel is produced by means of a sealing element, wherein an attachment element of the first trim panel, which attachment element extends along the sealing element and interacts with the sealing element, is either inserted into an insertion groove of the sealing element or is placed onto a clamping element of the sealing element. This makes it possible according to the invention not only to enable an extremely lightweight arrangement of the vehicle door arrangement but also to realize simple and cost-effective assembly of the vehicle door arrangement.

DRAWINGS

The invention is explained in more detail below with reference to the following figures. These explanations are merely by way of example and do not restrict the general inventive concept.

DETAILED DESCRIPTION

Figure 1:
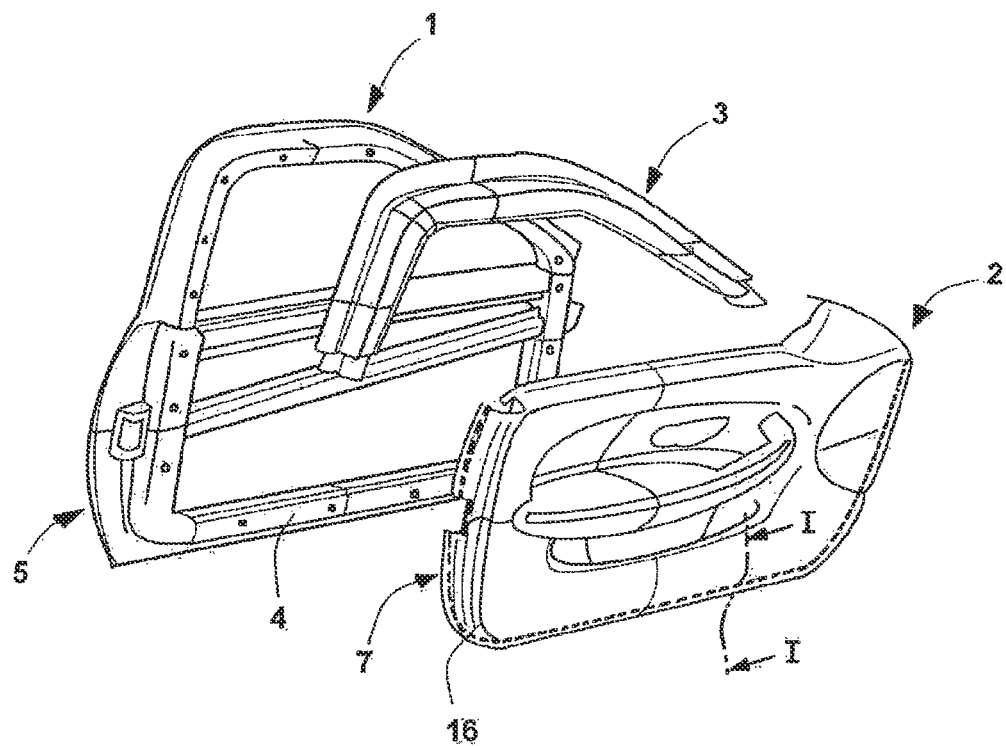
FIG. 1 shows a vehicle door arrangement according to the present invention.

FIG. 1 schematically depicts an exploded drawing of a vehicle door in a perspective illustration. The vehicle door or the vehicle door arrangement here has a first trim panel 1 which, in the example illustrated, corresponds to an outer panel of the vehicle door arrangement. Furthermore, the vehicle door arrangement has a second trim panel 2 and a window frame covering 3. The second trim panel 2 and the window frame covering 3 are jointly referred to below as the second trim panel 2, 3. In the depiction illustrated by way of example, the second trim panel 2, 3 corresponds to an inner panel of the vehicle door arrangement. The vehicle door arrangement furthermore has a structural element 4 which is realized in particular in the form of a frame arrangement for example of extruded profiles or the like.

A sealing element 7 is provided in the form in particular of a panel weatherstrip along a line (indicated by dashed lines) which indicates the profile 16 of the panel weatherstrip and of the sealing element 7.

An intersection line I-I, according to which the sectional illustrations according to FIGS. 3 to 7 should be conceived, is illustrated schematically in the lower region of the illustration according to FIG. 1.

Figure 2:
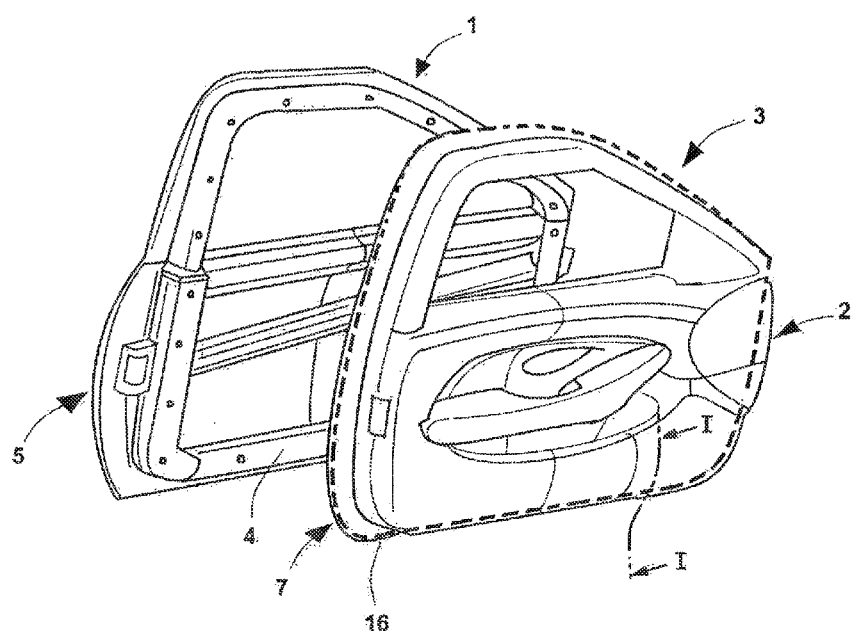
FIG. 2 shows a further embodiment of a vehicle door arrangement according to the present invention.

FIG. 2 illustrates an exploded illustration of a further vehicle door arrangement according to the invention according to a further embodiment. As an alternative to the first embodiment possible according to FIG. 1, the embodiment according to FIG. 2 bears an integrated second trim panel 2, 3, in which the window frame covering 3 or that region of the second trim panel which takes over the window frame covering 3 is integrated with the remaining part of the second trim panel 2, 3. The vehicle door arrangement again has the structural element 4. Furthermore, the sealing element 7 is again illustrated by means of a dashed line 16 which indicates the profile of the trim panel.

Figure 3:
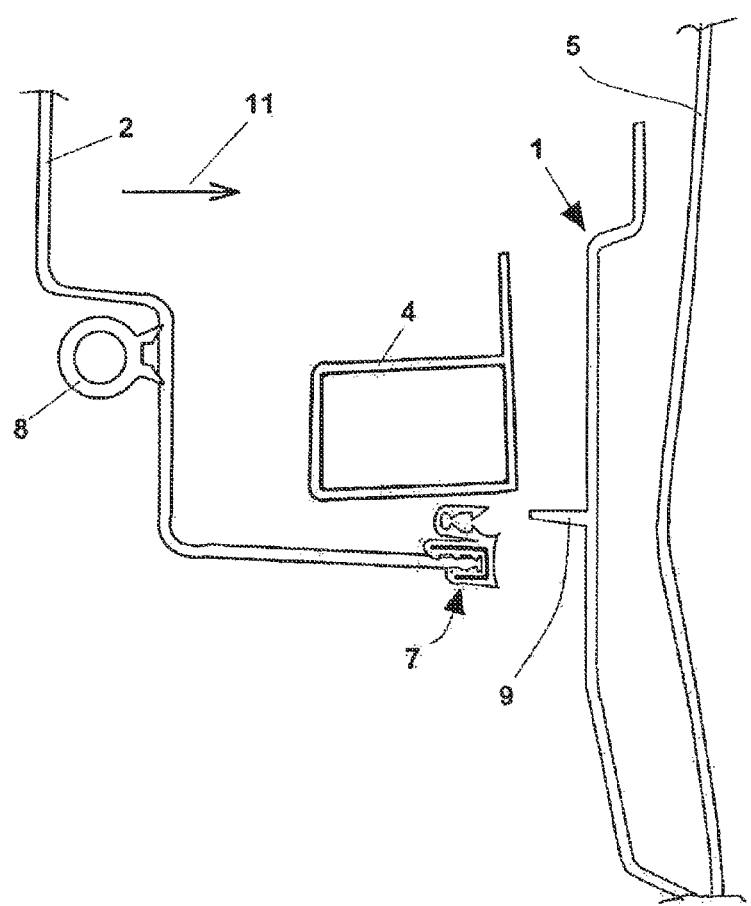
FIG. 3 shows, in a cross-sectional illustration, part of the connecting region of a first and second trim panel of a vehicle door arrangement according to the invention in the unassembled state.
Figure 4:
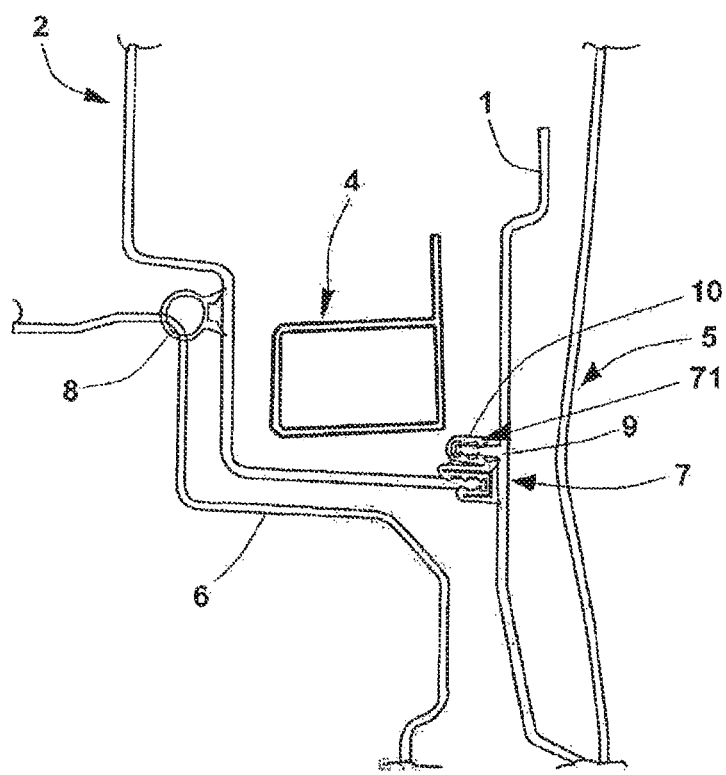
FIG. 4 shows, in a cross-sectional illustration, part of the first and second trim panel of the vehicle door arrangement according to the invention in an assembled state.

FIGS. 3 to 7 each correspond to a sectional illustration perpendicular to the profile of the sealing element 7, approximately according to the intersection lines I-I according to FIGS. 1 and 2. In this connection, FIG. 3 illustrates the first trim panel 1 and the second trim panel 2 in an unassembled state. The assembled state, as illustrated according to FIG. 4, is produced from the unassembled state according to FIG. 3 by a relative movement of the first trim panel 1 and of the second trim panel 2 along an assembly direction 11 which is merely depicted in FIG. 3. As can be seen, the first trim panel 1 has a paneling 5 which corresponds, for example, to the aesthetically attractive shaping of the vehicle door arrangement. In order to connect the first and second trim panels 1, 2, at least one attachment element 9 is provided, according to the invention, on the first trim panel 1. For assembly purposes, the attachment element 9 is connected to the sealing element 7. FIG. 4 furthermore also schematically illustrates an element 6 on the vehicle side, which element is, for example, the body-side sill region of the vehicle. For the sealing of the vehicle interior (on the left side of the second trim panel 2 in the illustration according to FIG. 4), a further seal 8, for example a door seal 8, is provided according to the invention. According to the illustration in FIG. 4 and FIG. 5, the sealing element 7 has an insertion groove 71, which has, by way of example, a "clamping profile" 10, in order to receive the attachment element 9 of the first trim panel 1.

Figure 5:
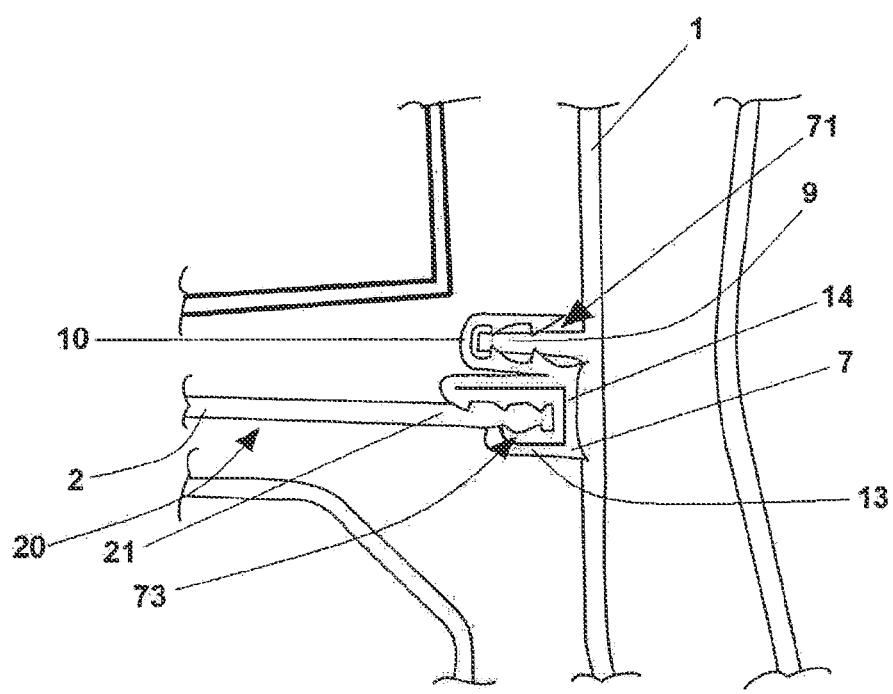
FIG. 5 to 7 show detailed illustrations of the connection of the trim panels according to three sectional illustrations.
Figure 6:
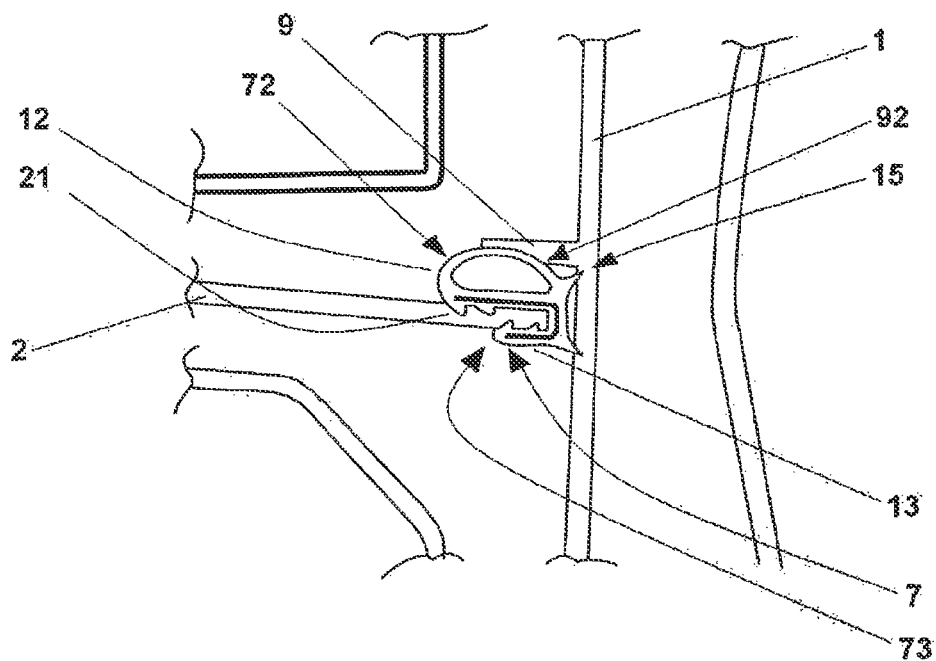
Figure 7:
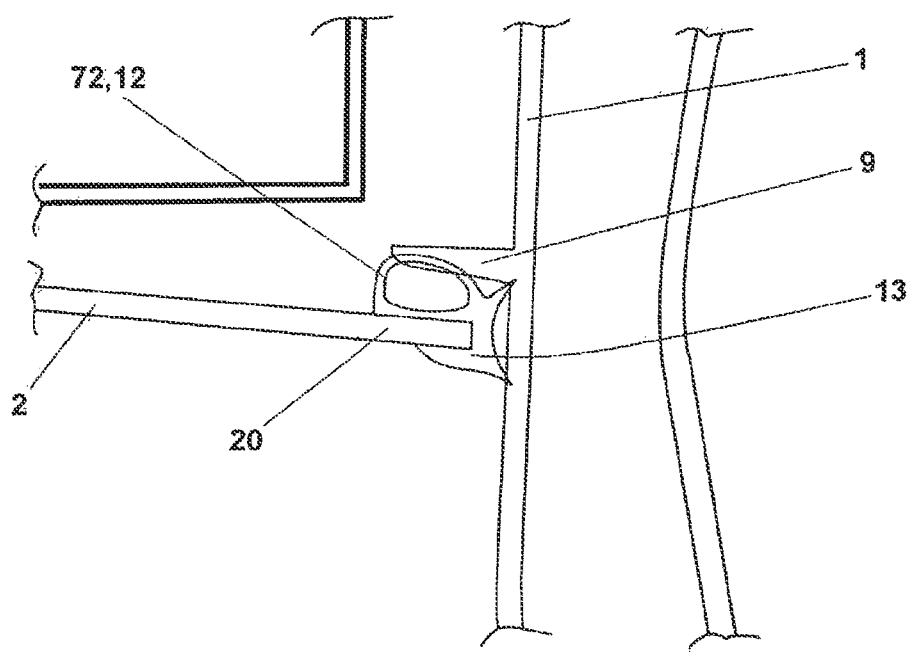

FIGS. 5 to 7 show various embodiments of the configuration of the sealing element 7 according to various alternatives of the present invention. In all of the exemplary embodiments illustrated in conjunction with the figures, the first trim panel 1 serves for the outer panel of the vehicle door arrangement and the trim panel 2, 3 serves for the inner panel of the vehicle door arrangement. However, according to the invention, the roles of the first and second trim panels may be entirely interchanged.

According to a variant embodiment of the sealing element 7 according to the present invention, the first trim panel 1 has the attachment element 9, and the second trim panel 2 has a second attachment element 20 which extends along the sealing element 7 and interacts with the sealing element 7. The further attachment element 20 has a further attachment region 21 which is connected on both sides of a further insertion groove 73 of the sealing element 7. In the exemplary embodiment illustrated in FIG. 5, the further insertion groove 73 is designed in particular as a "covering profile" 30 and is capable of providing a good support or good connection between the second trim panel 2, 3 (or the connection region 21) and the sealing element 7. To further improve the connection between the second trim panel 2, 3 and the sealing element 7, provision may be made, according to a particularly preferred embodiment illustrated in FIG. 5, for a reinforcing element 14, for example in the form of a metal core 14, to be provided running in the sealing element 7, said reinforcing element reinforcing and improving the clamping action in the region of the further attachment element 20. According to the variant embodiment illustrated in FIG. 5, the attachment element 9 is inserted into the insertion groove 71 of the sealing element 7, thus enabling a solid connection between the first and second trim panels 2, 3 to be realized. In the variant embodiment illustrated in FIG. 5, the insertion groove 71 is designed in particular as a clamping profile 10, i.e. the insertion groove 71 again has hook-shaped structures making it difficult to detach the first trim panel 1 from the second trim panel 2, 3 and increasing the retaining forces.

FIG. 6 illustrates a further variant embodiment of the sealing element 7 according to the present invention. The attachment of the sealing element 7 to the second trim panel 2, 3 is again designed in the form of a covering profile 13 and in the form of the further insertion groove 73. However, in the further variant embodiment according to FIG. 6, a difference arises with regard to the attachment element 9 to the effect that the sealing element 7 does not have an insertion groove for the attachment element 9 but rather a pressure profile 12 which is also referred to within the context of the present invention as a clamping element 72. In this connection, the clamping element 72 is arranged substantially exclusively on an attachment surface 92 on one side of the attachment element 9 such that, by means of the clamping element 72, the sealing element 7 exerts a clamping pressure on the attachment element 9, the clamping pressure blocking the first trim panel 1 relative to the second trim panel 2, 3. In particular for the situation of a completely encircling embodiment of the sealing element 7, it is advantageously possible, according to the invention, in the variant embodiment according to FIG. 6, for a precise positioning of the trim panels 1, 2, 3 relative to one another to be possible in a simple manner.

According to the variant embodiment according to FIG. 6, the sealing element 7 can in particular have a sealing lip 15 or a plurality of sealing lips 15 so that the cavity of the vehicle door arrangement, which cavity is enclosed by the first and second trim panels 1, 2, 3, is sealed in a suitable manner or is at least protected from spray water, drafts or the like.

In the variant embodiment according to FIG. 7, a clamping element 72 or a pressure profile 12 is again provided on the sealing element 7 with regard to the attachment element 9, but the sealing element 7 is not plugged onto the further attachment element 20 (i.e. premanufactured and subsequently plugged on) but rather the sealing element 7 together with the connection to the second trim panel 2 is shaped such that a particularly fixed connection can be realized between the sealing element 7 and the second trim panel 2, 3. In the variant embodiment shown in FIG. 7, the connection between the further attachment element 20 of the second trim panel 2,3 and the sealing element 7 can be provided, for example, by means of robot extrusion, wherein automatic fixing of the sealing element 7 permits the secure adhesion of the sealing element 7 or weatherstrip given an appropriate pairing of material between the material of the further attachment element or the further attachment region 71, on the one hand, and the material of the sealing element 7, on the other hand, which is possible in an advantageous manner, for example, by cross linking between said materials.

The variant embodiment in which the sealing element 7 has a clamping element 72 has the advantage that, in the event of use, for example, of a hollow profile as the pressure profile 12 or as the clamping element 72, the possible tolerances between the first and second trim panel are compensated for in a manner encircling along the sealing element 7, and therefore the panel edge is grasped, for example, in an encircling manner and therefore tolerances are covered in a visually balanced manner and a gap-free, neat final fit in the first and in the second trim panels 1, 2, 3 is enabled. In particular in this variant embodiment of the present invention, in addition to such a connection between the first and second trim panels 1, 2, 3 provision is additionally also made for an additional mechanical connection to be realized between the trim panels 1, 2, 3, for example by means of clip-connecting elements (not illustrated).

LIST OF REFERENCE SYMBOLS

1 First trim panel/door body
2 Second trim panel/door inner panel
3 Window frame covering
4 Profiled construction of the structural element/body
5 Door outer paneling
6 Sill
7 Sealing element/panel weatherstrip
8 Primary door seal
9 Attachment element/encircling positioning rib
10 Clamping profile
11 Assembly direction
12 Pressure profile
13 Covering profile
14 Reinforcing element/metal core
15 Sealing lip
16 Profile of the sealing element/panel weatherstrip
20 Further attachment element
21 Further attachment region
71 Insertion groove
72 Clamping element
73 Further insertion groove
91 Attachment region
92 Attachment surface

The invention claimed is:

1. A vehicle door arrangement comprising
a first trim panel;
a second trim panel;
a sealing element configured to establish a connection between the first trim panel and the second trim panel and to block movement of the first and second trim panels away from one another, the sealing element comprising:
a first insertion groove having a c-shape and being configured to receive a first attachment element of the first trim panel; and
a second insertion groove having a c-shape and being configured to receive a second attachment element of the second trim panel, wherein the first insertion groove is open toward a first direction and the second insertion groove is open toward a second direction, opposite the first direction, the first insertion groove comprises a first arm and a second arm extending generally parallel to one another and defining a first opening configured to receive the first attachment element, and the second insertion groove comprises a third arm and a fourth arm extending generally parallel to one another and defining a second opening configured to receive the second attachment element.

2. The vehicle door arrangement as claimed in claim 1, wherein the first attachment element extends along the sealing element, and the second attachment element extends along the sealing element.

3. The vehicle door arrangement as claimed in claim 1, wherein the first trim panel is an outer panel and the second trim panel is an inner panel of the vehicle door arrangement.

* * * * *